INVENTORS
Otto GLÖCKLER
Wolfgang REICHARDT

United States Patent Office 3,430,616
Patented Mar. 4, 1969

3,430,616
FUEL INJECTION CONTROL SYSTEM
Otto Glöckler, Renningen, and Wolfgang Reichardt, Stuttgart-Rohr, Germany, assignors to Robert Bosch G.m.b.H., Stuttgart, Germany, a limited-liability company of Germany
Filed Nov. 2, 1967, Ser. No. 680,144
Claims priority, application Germany, Nov. 11, 1966, B 89,785
U.S. Cl. 123—119          13 Claims
Int. Cl. F02m 51/06, 61/14

ABSTRACT OF THE DISCLOSURE

The operating time of electrically controlled fuel injection valves is determined by the opening time of AND-gates connected to the valves, and having, as their input, pulses from a monostable multivibrator, the pulse period of which depends on an operating parameter of the engine, as well as a gating pulse derived from a signal generator, preferably having a contactless or low power input, and synchronized with the speed of the engine; to prevent injection of fuel during downhill coasting, a blocking impulse may be applied to the AND-gates through a third input.

---

The present invention relates to a fuel injection control system for internal combustion engines and more particularly to engines for motor vehicles in which raw fuel is injected adjcent the inlet valves to each cylinder. The opening time of the injection valves depends on an operating parameter of the engine and more particularly on the vacuum in the intake manifold, the occurrence of each pulse of the multivibrator being controlled by pulses applied thereto in synchronism with the speed of the engine.

Customarily, an inlet valve is associated with one or more cylinders of the internal combustion engine. The injection valve is controlled electrically, and opened during a period of time by current pulses in accordance with fuel requirements.

The various cylinders of a multi-cylinder engine need fuel at different times, and thus the injection valves must be opened at different times. The injection valves for a number of cylinders can be combined in groups without substantially detracting from the operating efficiency of the engine. For example, a four-cylinder engine can be built with two groups of two injection valves each, a six-cylinder engine with two groups of three injection valves, the injection valves of a group having a common current impulse applied.

Various ways have been proposed to provide temporarily staggered or shifted current impulses. In one known arrangement, a single multivibrator circuit is provided supplying current impulses for both groups of valves. The output of the multivibrator is then connected first to one, then to the other group of injection valves by means of a transfer switch controlled by a cam, connected to the cam shaft of the engine. Such an arrangement operates satisfactorily. It has been found, however, that mechanical switching may become unreliable because the contacts may become dirty, contaminated, or may be subject to contact chatter, thus introducing an additional source of possible trouble. Further, such a transfer switch can become complicated when the number of groups of valves increases.

According to the arrangement described in U.S. Patent 2,867,200, a pair of valves, or groups of valves, are controlled without such a transfer switch by utilizing a pair of separate monostable multivibrators which have trigger impulses applied thereto phase shifted with respect to each other by 180°. The impulse period of both multivibrators is controlled in the same sense, and in dependence on the vacuum in the intake manifold. Each multivibrator controls only that group of valves with which it is associated. Such a circuit may, however, become uneconomical since a pair of multivibrators of substantially identical operating characteristics are necessary. Inductive control of the impulse period of a pair of multivibrators further may prove to be difficult.

It has therefore been proposed to control separate groups of injection valves from a single multivibrator, utilizing a pair of separate trigger sources, and a pair of separate bistable multivibrators, each controlling a group of injection valves. Each bistable multivibrator is then switched on by a coordinate trigger source and switched off by the monostable multivibrator. Such an arrangement works well, but still requires an increased number of components due to the necessity for a separate bistable multivibrator circuit for each group of valves.

It is an object of the present invention to avoid the disadvantages of known fuel injection systems and more particularly to provide a fuel injection system utilizing only a single monostable multivibrator having an impulse period dependent on an operating parameter of the engine and controlling a plurality of injection valves, or groups of injection valves without requiring complicated transfer switching arrangements.

*Subject matter of the present invention*

Each group of injection valves has an AND-gate associated therewith. Output pulses of a monostable multivibrator are applied as one input to all the AND-gates. A source of signals is provided, formed either by a plurality of signal generators or by a single signal generator having a plurality of outputs, which provides temporarily staggered or shifted output pulses. Each output pulse is applied as another input to a respective AND-gate. Thus, the AND-gates direct the pulses from the multivibrator to the respective associated injection valve.

It is thus only necessary to provide for each group of valves, or for each valve to be controlled separately an AND-gate and signal generator, to permit control by a single monostable multivibrator of a plurality of valves or groups of valves. The transfer switch to transfer impulses can thus be omitted.

Various possibilities suggest themselves for the construction of the signal pulse source. Preferably the signal generator is so constructed that the output impulses are at least as long as the output impulses of the monostable multivibrator, so that the injection pulse time is determined only by the monostable multibrator. It is also possible, however, to provide shorter output impulses from the signal generator during specific operating conditions of the internal combustion engine. For example, in automotive use, it is desirable to decrease the amount of fuel when the engine is operating as an engine brake, or when the speed of the engine exceeds a certain value.

The signal generator may be formed as a group of separate contacts, arranged in the distributor of the ignition system and so located that any one contact remains closed until just before the closing of a subsequent contact.

A bistable multivibrator may also be used as a signal generator which is controlled by short impulses. The bistable multivibrator will remain in one switching state until the next impulse causes it to switch over. Such an arrangement is particularly useful when the synchronizing impulses are derived from a contactless impulse source, for example, from a magnetic or photoelectric impulse generator. A particularly simple solution is obtained when the input impulses are derived from the high tension side of the distributor. The addition of parts or contacts to the distributor can be avoided by use of capacitative or inductive coupling to an ignition cable. The particular selection of the cable is chosen with respect to the timing of the ignition impulse. In a four-cylinder engine, the timing selection is so made that one injection valve of a group of two valves injects fuel directly through the open inlet valve into the associated cylinder.

The AND-gates can readily be provided with a third input which is connected to a blocking circuit which provides a blocking potential if it is desired to interrupt injection of fuel, for example, when the vehicle is being pushed, or coasting downhill. Such a blocking circuit can become operative when the speed of the engine exceeds a predetermined value while at the same time the accelerator pedal is not depressed.

The structure, organization, and operation of the invention will now be described more specifically with reference to the accompanying drawings, wherein.

Figure 1:
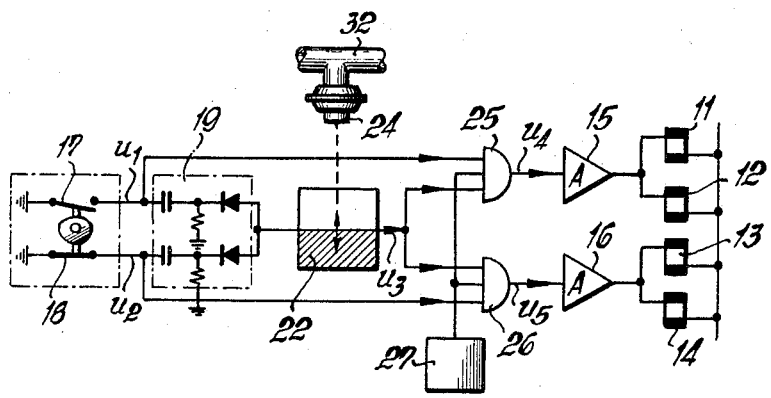
FIGURE 1 is a schematic block diagram, of a fuel injection control system in accordance with the present invention.
Figure 2:
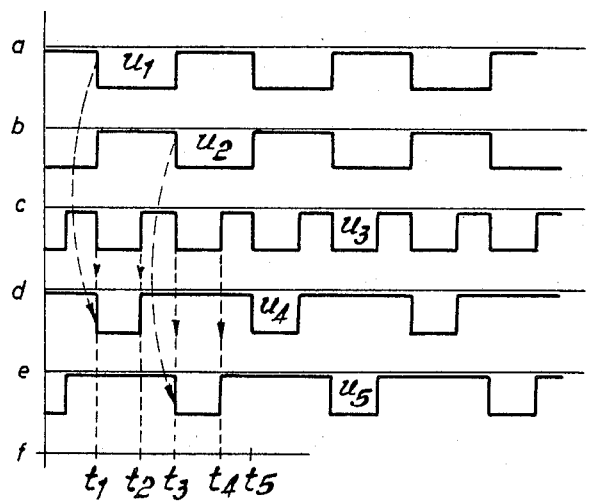
FIGURE 2 is a timing diagram illustrating the operation of the system.

Referring now to the drawings and in particular to FIGURE 1:

A four-cylinder engine, not shown, has four injection valves, the operating coils for which are indicated at 11, 12, 13, 14 schematically. Each one of these valves is located just in front of the inlet valves of each of the four cylinders, as better seen in FIGURE 3. The valves 11 and 12 are arranged in one group, and valves 13, 14 in another. Each one of these groups is connected to an amplifier 15, 16. In order to control the amplifiers 15, 16 for proper operation, control signals are obtained from a signal generator formed of a pair of switches 17, 18 and operated in synchronism with the engine from the cam shaft thereof. At the output of switches 17, 18 potentials $u_1$ and $u_2$ appear, the potential distribution of which is shown in FIGURE 2 at lines $a$ and $b$, respectively. Each one of the contacts closes shortly after the other contact has just opened.

Potentials $u_1$ and $u_2$ are applied to a differentiator 19 in which the potentials $u_1$ and $u_2$ are separately differentiated. The leading edge of $u_1$ is shown on the timing line $f$ of FIGURE 2 to occur at time $t_1$; the leading edge of potential $u_2$ at time $t_3$. These leading edges each provide a pulse which is applied to a monostable multivibrator 22, to trigger the monostable multivibrator 22 in its unstable condition, from which it returns again into the quiescent state after a predetermined period of time. This time period is determined by varying the timing parameters of a timing network within multivibrator 22 in accordance with an operating parameter of the engine, and in particular, in accordance with the vacuum in the intake manifold 32 as sensed by the diaphragm in a vacuum chamber 24.

The output of multivibrator 22 provides pulses $u_3$ line $c$, FIGURE 2) which are both applied to the amplifiers 15, 16 over a pair of AND-gates 25, 26, respectively. The period of time of the pulses depends upon the vacuum in manifold 32.

Each one of the AND-gates 25, 26 has three inputs. One of the inputs is obtained from the multivibrator 22. Another input to AND-gate 25 is the potential $u_1$; an input to AND-gate 26 is the potential $u_2$. The third input of both AND-gates is derived from a source 27, the output of which depends on the position of the accelerator pedal and the speed of the engine so that, under predetermined operating conditions, both AND-gates 25, 26 can be blocked, as will be described in detail below.

Let it be assumed that the output from source 27 is sufficiently high so that the AND-gates 25, 26 are not blocked thereby. Potential $u_1$ connected to AND-gate 25 can pass a pulse $u_3$ from multivibrator 22 only when potential $u_1$ has a definite value, that is, only during the period $t_1$ to $t_3$ (FIGURE 2). Likewise, AND-gate 26, to which the potential $u_2$ is applied can pass pulses $u_3$ from multivibrator 22 only when the potential $u_2$ has a predetermined value, for example, as indicated in FIGURE 2 between the period of time $t_3$ to $t_5$.

The output of AND-gate 25 thus provides pulses $u_4$ (FIGURE 2, line $d$) and the output of AND-gate 26 provides pulses $u_5$ (FIGURE 2, line $e$) which are of the same time duration, but of half the frequency as the pulses $u_3$. Pulses $u_4$ control valves 11 and 12 and pulses $u_5$ the valves 13 and 14. The two groups of valves thus are opened alternatingly.

The switches 17, 18 can be made part of the distributor assembly of the ignition system of the engine.

Figure 3:
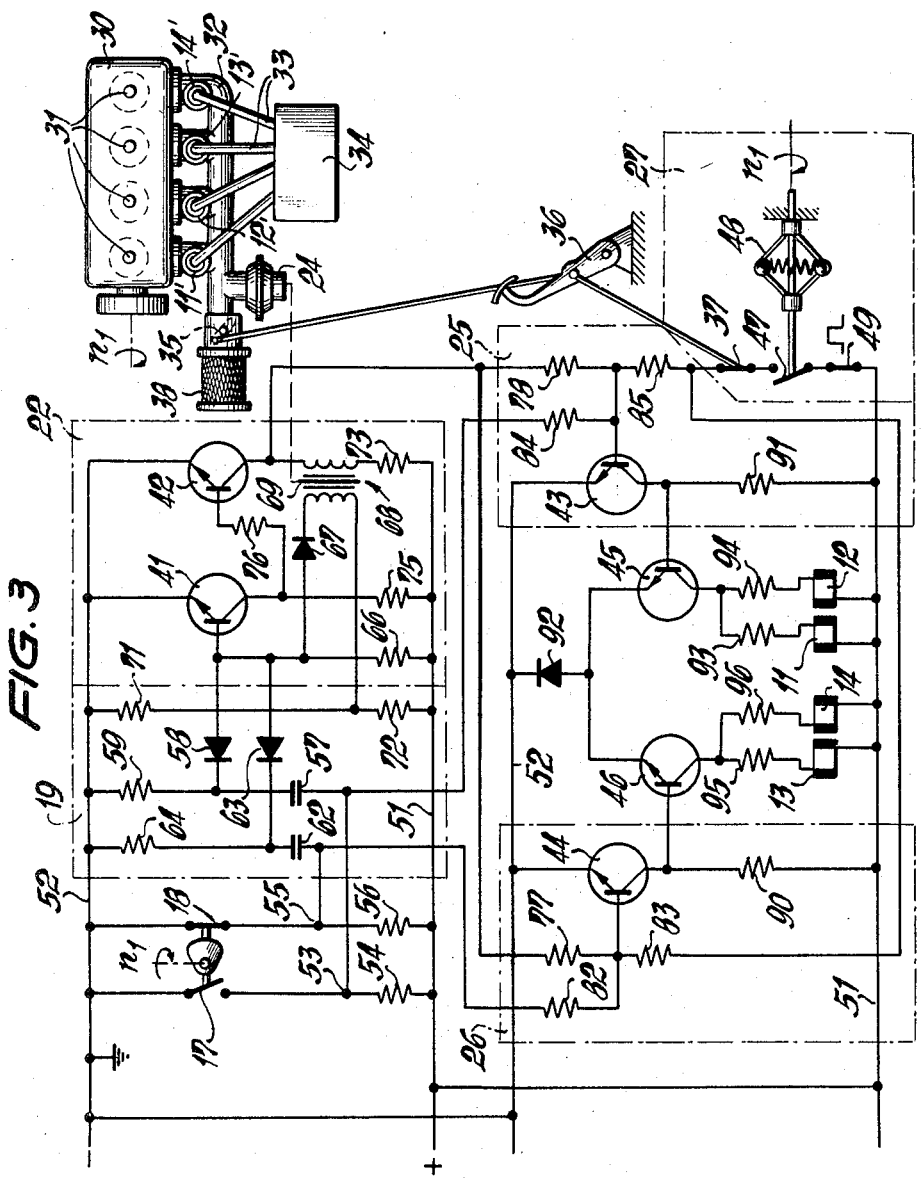
FIGURE 3 is a circuit diagram.

FIGURE 3 illustrates the circuit diagram for an ignition control system. Four-cylinder engine 30 has spark plugs 31 supplied by an ignition system, not shown. The cam-shaft rotates at a speed $n_1$ as schematically indicated by the arrow. Four fuel injection valves 11', 12' and 13', 14' are located immediately adjacent the inlet valves to the cylinders of the engines, each at the individual inlet stub branching off from manifold 32. Each one of the injection valves has fuel supplied thereto under pressure from a fuel supply 34. A throttle 35 operated from an accelerator pedal 36 is connected to the inlet of the inlet manifold 32, to control air being drawn into the cylinder through a filter 38. The accelerator pedal 36 further controls a switch 37 which is closed only when the accelerator pedal 36 is at or near the position at which the engine idles, that is, in a position when throttle 35 is closed or almost closed.

The coils 11, 12, and 13, 14 of the injection valves are activated by the switches 17, 18 which close in synchronism with the rotation of a cam driven by the engine 30, as indicated schematically by the arrow $n_1$. Differentiating circuit 19, containing an R–C network, is connected to monostable multivibrator 22, having two npn transistors 41, 42. Its output, as well as the output of signal source 17 is applied to AND-gate 25, which includes an npn transistor 43. Likewise, AND-gate 26, having an npn transistor 44 has the output of multivibrator 22 and the switch 18 applied thereto. The outputs of the AND-gates 25, 26 control a pair of power transistors 45, 46 which correspond to the amplifiers 15, 16 in FIGURE 1. The power transistors 45, 46 in turn control the coils 11 to 14 of the injection valves.

The source 27 (FIGURE 1) is formed by switch 37 and serially connected switches 47, 49. Switch 47 is operated in dependence upon the speed of the engine. At high engine speed, the centrifugal motion transmitter 48 closes switch 47. Of course, equivalent electronic circuits could be used. Switch 49 is a bi-metallic switch, connected in heat conductive relation to engine 30 and closes only when engine 30 has reached its operating temperature. Source 27 is connected to the input of the AND-gates having transistors 43, 44; it could, however, be also connected to short circuit the output transistors 45, 46 upon being activated.

The circuit of FIGURE 3 is supplied with operating potential of, for example, 12 volts from the battery of the vehicle, which connects to a positive bus 51 and a negative bus 52 which is connected to chassis. Contacts 17, 18 have one terminal connected directly to chassis 52. The other terminal of contact 17 is connected to a junction 53, from which a resistance 54 on the one hand connects to the positive bus 51; likewise, the other terminal of contact 18 connects to a junction 55 and then over a resistance 56 to the positive bus 51. Junction 53 connects over a condenser 57 with a cathode of a diode 58 and over a resistance 59 to chassis and negative bus 52. The anode of the diode 58 connects to the base of transistor 41. Likewise, junction 55 connects over a condenser 62 to the cathode of a diode 63 and then over a resistance 64 to chassis or negative bus 52. The anode of diode 63 likewise connects to the base of transistor 41.

As can be seen, the network formed of condenser 57 and resistance 59 as well as condenser 62 and resistance 64, each form a differentiating network which, upon closing of contacts 17 or 18, respectively, supplies a negative pulse; upon opening, a positive pulse is supplied. The diodes 58, 63 respectively only pass the negative pulses.

The base of transistor 41 is connected over a resistance 66 with a positive line 51. Further, the base connects with the anode of a diode 67, the cathode of which is in series with the secondary winding of a transducer 68, having a movable core 69. The other terminal of the transducer 68 connects to a voltage divider formed of resistances 71, 72. The primary of the transducer 68 connects to the collector of transistor 42, which, in turn, is connected over a resistance 73 with the positive line 51.

The movable iron core 69 is mechanically linked with the diaphragm of a vacuum chamber 24, connected to the intake manifold 32. When throttle 35 is closed, so that a substantial vacuum arises within the intake manifold, core 69 is pulled out from the transducer 68 thus decreasing the inductivity of the primary winding.

The emitters of the transistors 41, 42 are each connected to the negative line 52. The collector of transistor 41 connects over collector resistance 75 with the positive line 51 and further over resistance 76 to the base of transistor 42. Transistors 41, 42 together form a monostable multivibrator 22. The construction of this monostable multivibrator is known and its operation need be described only briefly. Under normal conditions, transistor 41 is conductive and transistor 42 is blocked, since the base of transistor 41 has a potential which is positive with respect to its emitter due to the presence of resistance 66. If a negative pulse is applied to the base of transistor 41 from any one of signal sources 17 or 18, transistor 41 blocks and transistor 42 becomes conductive and carries current over the primary winding of transducer 68, connected in its collector circuit. This current will rapidly rise to its quiescent value, which is determined by the inherent resistance of the winding as well as the resistance 73.

As the current rises in the primary, the secondary will have an exponentially decreasing voltage induced therein which causes the base of the transistor 41 to become more negative. As soon as this potential disappears, the base of transistor 41 again becomes positive, transistor 41 thus becomes conductive and simultaneously blocks transistor 42. Thus, the collector of transistor 42 will have impulses $u_3$ (line c, FIGURE 2) arise thereat, the duration of which will depend on the vacuum in manifold 32. If desired, the impulse period can be further made dependent on other parameters of the engine, such as engine temperature, battery potential, engine speed or artifical fuel enrichment during starting, by electronically modifying the unstable period of the monostable multivibrator, for example, by the use of non-linear circuits, the characteristics of which depend on the operating parameters of the engine to be compensated for.

Pulses $u_3$ (FIGURE 2, line c) are applied over resistance 77 to the base of transistor 44 and over a resistance 78 to the base of transsitor 43. The base of transistor 44 is further connected over a resistance 82 with junction 55 and over a resistance 83 with the signal source 27. The base of transistor 43 is connected over a resistance 84 with junction 53 and over a resistance 85 with the output of signal source 27. Resistances 83, 85 are de-coupling resistances isolating the inputs of transistors 43 and 44 from each other, and are suitably proportioned to prevent mutual interference. If necessary, a pair of diodes may additionally be used.

Each of transistors 43, 44 is blocked only when positive potential is absent on any one of resistances 77, 78, 82, 83, 84 or 85. Thus, transistors 43, 44 act as AND-gates and simultaneously provide for polarity inversion.

The emitters of the transistors 43, 44 are connected to the negative line 52. The collector of transistor 44 connects to the base of transistor 46 and over a collector resistance 90 to the positive line 51. Likewise, the collector of transistor 43 connects with the base of transistor 45 and over a collector resistance 91 with the positive line 51. The emitters of transistors 45, 46 are connected together and to the anode of a diode 92, the cathode of which connects to the negative line 52. The diode provides the necessary bias potential.

The windings 11, 12 of injection valves 11', 12' are connected in series each with a resistance 93, 94, respectively between the collector of transistor 45 and the positive bus 51. Likewise, the windings 13, 14 of injection valves 13', 14' are connected in series with a resistance 95, 96, respectively between the collector of transistor 46 and the positive bus 51.

Let it be assumed that at least one of the switches 37 or 47 is open. Transistors 43, 44 are blocked if at the same time the associated contact 17 or 18 is closed and the multivibrator 22 supplies a pulse. When transistor 43 blocks, transistor 45 becomes conductive and the injection valves 11' and 12' are opened. Likewise, transistor 46 conducts when transistor 44 blocks and injection valves 13' and 14' are then opened. Let it be further assumed that, as the engine 30 turns, switch 18 opens and switch 17 closes. Upon closing of switch 17, a pulse is applied to the input of multivibrator 22 over condenser 57, resistance 59 and diode 58. This pulse, which is negative, blocks transistor 41. Transistor 42 becomes conductive during a period of time which is determined by the vacuum in intake manifold 32 as sensed by vacuum chamber 24. A negative pulse will thus arise at the collector of transistor 42 which, together with the switching impulse of the contact 17, is applied to the input of transistor 43 and blocks this transistor for so long as both pulses are simultaneously applied thereto. During this blocking period, which is equal to the impulse period of the multivibrator, injection valves 11' and 12' will be open and inject a suitable amount of fuel into the inlet stub of the cylinder associated therewith, the amount depending upon the time during which the valve is open. Transistor 44 cannot be blocked during this time, since the switch 18 is open and positive potential is applied over resistances 56 and 82 to its base. The injection valves 13', 14' thus are closed during this time. Likewise, when switch 17 opens and switch 18 closes, the injection valves 13', 14' are operated, whereas the valves 11', 12' are closed. Thus, the groups of valves 11', 12' and 13', 14' are operated alternately. A mechanical transfer switch, or a pair of multivibrators, one for each group of injection valves, is thus not necessary.

When the accelerator pedal 36 is in a position corresponding to idling of the engine 30 and the speed $n_1$ is high, for example, because the automobile is coasting downhill with engine engaged, no fuel is necessary. In this condition switches 37 and 47 are closed and the bases of the transistors 43, 44 receive a positive potential over resistances 85, 83 so that they are continuously conductive and block the injection valves 11' to 14'. The fuel consumption is thus easily reduced and unburned gases will not be exhausted into the atmosphere. If, however, engine 30 has not yet reached its operating temperature, then closing of the injection valves 49 is prevented by the temperature-sensitive bi-metallic switch 49 which will remain open.

Figure 4:
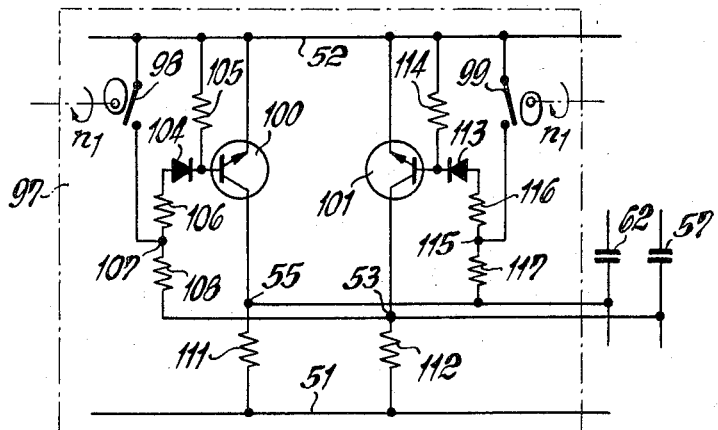
FIGURE 4 is a partial diagram illustrating a modification of the circuit of FIGURE 3.

FIGURE 4 illustrates a different embodiment of the signal generator. It is difficult to adjust contacts in such a manner that they do not chatter even at high operating speeds, and to further adjust these contacts so that the opening and closing positions follow each other rapidly, in time. A bistable multivibrator 97 is provided and can be inserted in place of the switches 17, 18 in the circuit in accordance with FIGURE 3. Junction points 53 and 55, in accordance with FIGURE 3, are indicated in FIGURE 4, as well as condensers 57 and 62. The multivibrator 97 can be triggered by various sources, for example, by inductive, capacitative or photoelectric means or, as illustrated, by switches 98, 99 driven from the camshaft by means of cams. A bistable multivibrator 97 has two npn transistors 100, 101, the emitters of which are connected directly to the negative line 52. The base of transistor 100 is directly connected to the cathode of a diode 104 and over a resistance 105 to negative line 52. The anode of diode 104 connects over a resistance 106, a junction 107 and a resistance 108 with the collector of transistor 101 and with junction point 53. Switch 98 is inserted between junction 107 and negative line 52. The collector of transistor 100 is connected over a resistance 111 with a positive line 51; the collector of transistor 101 coonnects over a resistance 112 with the positive line 51. The base of transistor 101 is connected directly with the cathode of a diode 113 and over a resistance 114 with the negative line 52. The anode of diode 113 connects over a seriesconnection of a pair of resistances 116, 117, having a junction point 115 therebetween with the collector of transistor 100. Switch 99 is inserted between junction 115 and negative line 52. Diodes 104 and 113 prevent application of negative potential peaks to the transistors 100, 101.

Let it be assumed that transistor 100 is conductive and transistor 101 is blocked. If switch 98 is closed, the base of transistor 100 will have the potential of the negative line 52 applied thereto, and transistor 100 will block, for which a short impulse suffices. Transistor 101 will thus become conductive and will remain conductive until switch 98 closes. The collectors of transistors 100, 101 will thus provide a series of rectangular potential pulses, the beginning of one pulse following rapidly after the end of a preceding pulse. The circuit of the embodiment of FIGURE 4 has the advantage that the potential impulses are uniform and improper switching due to contact chatter, dirty contacts or the like are avoided. As seen, each transistor 100, 101 serves as a signal source for the circuit connected thereto, namely differentiating circuit 19. The switches 98, 99 can, as previously indicated, be placed physically within the ignition system distributor.

Figure 5:
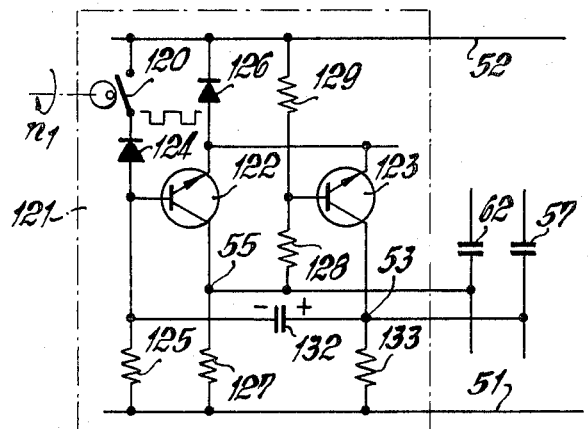
FIGURE 5 is another partial diagram illustrating another modification of the circuit in accordance with FIGURE 3.

A further embodiment of the signal source is illustrated in FIGURE 5. Signal generator 121 is again used instead of switches 17, 18 of FIGURE 3. Junctions 53, 55 and condensers 57, 62 in accordance with FIGURE 3 are indicated also in FIGURE 5.

The circuit of FIGURE 5 contains a single switch 120, controlling a double stage amplifier containing two npn transistors 122, 123 and forming, together with the switch 120, the signal generator. The switch 120 is formed in such a manner that during a full revolution of 360° it is open during 180° and closed during the remaining 180°. One terminal is connected to the negative line 52 and the other connected to the cathode of a diode 124, the anode of which connects to the base of transistor 122, and over a resistance 125 with positive lines 51.

The emitters of transistors 122, 123 are connected together and with the anode of a diode 126, the cathode of which connects to the negative line 52. The anode provides bias potential for the emitters of transistors 122, 123. The collector of transistor 122 connects to junction 55 and over a collector resistance 127 with the positive lines 51. Further, a coupling resistance 128 connects to the base of transistor 123 and then over a resistance 129 with negative line 52. The collector of transistor 123 connects to the junction 53 and then to one electrode of a condenser 132, the other electrode of which connects to the base of the transistor 122. Junction 23 also connects to positive line 51 over a resistance 133.

In operation, so long as switch 120 is open, transistor 122 is held conductive over resistance 125 and transistor 123 is blocked. Condenser 132 charges as indicated in FIGURE 5 by the + and −. Junction 55 during this time has approximately the potential of negative line 52. When switch 120 closes, transistor 122 blocks since its emitter is more positive than its base, due to the biasing diode 126. The potential of junction 55 becomes more positive and transistor 123 becomes conductive, so that its collector potential appearing at the junction 53 becomes more negative. This potential jump is transmitted over the condenser 132 to the base of transistor 122 and blocks transistor 122 even if the contact 120 should chatter upon the next closing, that is, should open momentarily after it should have remained closed. Condenser 132 and resistance 125 are chosen to be so small that the potential jump on the base of transistor 122 occurs only during a very short period of time, for example 1 to 2 msec., that is, shorter than the shortest closing time of contact 120, which, as has been found by experience, is approximately 10 msec. at the highest speed of usual automative internal combustion engines.

Due to condenser 132, the two-stage amplifier 121 acts as a short pulse time monostable multivibrator during the closing of contacts 120, and thus improper operation due to contact chatter is avoided.

As can be seen, it is possible to control a plurality of injection valves with a corresponding number of AND-gates and signal sources providing gating signals. Utilization of contactless pulse sources further improves the reliability of operation.

Figure 6:
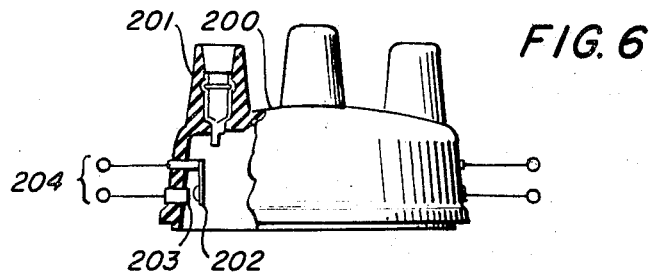
FIGURES 6 to 9 are schematic views illustrating various pulse sources.

Referring now to FIGURE 6, wherein half of a standard distributor cap is shown in cross-section: the distributor cap, normally made of an insulating material is shown at 200. One of the contacts for connection to a spark plug is shown in schematic form at 201, this contact and its protective housing being standard and well known in the art. Additionally, a pair of contacts 202, 203 are mounted at the side of the distributor cap 200, to be contacted by the distributor rotor during its rotation in synchronism with the engine. Some distributor rotors are provided with counterbalancing extensions opposite their contact arms. These extensions should be so placed or located that they do not cause closing of contacts 202, 203. The terminals 202, 203 can be brought out of the distributor cap 200 in any suitable manner, as schematically indicated at 204. Only one-half of the distributor cap is shown. A similar pair of contacts would be placed 180° displaced from the contacts 202, 203, as illustrated, thus providing switches 17 and 18 one on each side of the distributor cap.

Figure 7:
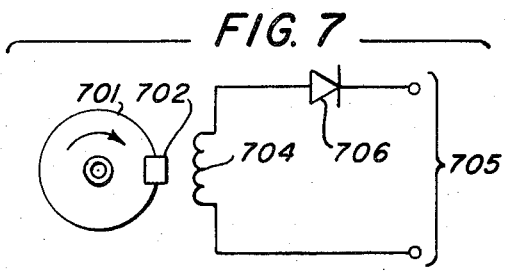

A form of contactless pulses source is shown in FIGURE 7. A disc 701, driven in synchronism with the shaft of the engine, has a magnet 702 located at its circumference. Magnetically coupled to the magnet 702 is a coil 704, which will have a pulse induced therein each time when the magnet 702 passes the coil. The disc is driven from the engine shaft. Negative pulses are supplied from the output 705 and can be connected in lieu of switch 120 in the embodiment of FIGURE 5. Diode 706, in series with the coil 704, blocks positive pulses.

A coil similar to coil 704 can be located 180° displaced from coil 704, and magnetically coupled to be swept by the field of magnet 702, to supply negative pulses to the bases of transistors 100, 101 in the embodiment of FIGURE 4. Likewise, negative pulses from the output 705, and a similar, symmetrical output, can be applied to junctions 53, 55 in the embodiment of FIGURE 3 in lieu of closing of switches 17, 18.

Figure 8:
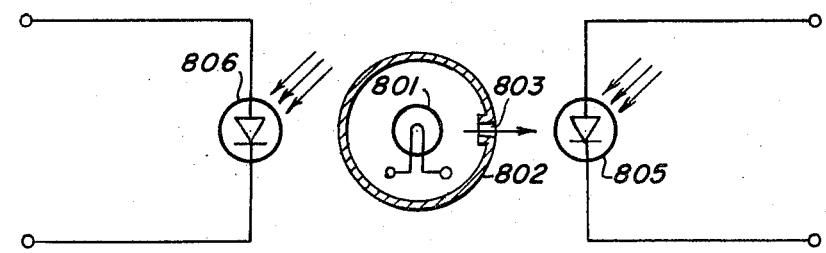
Figure 9:
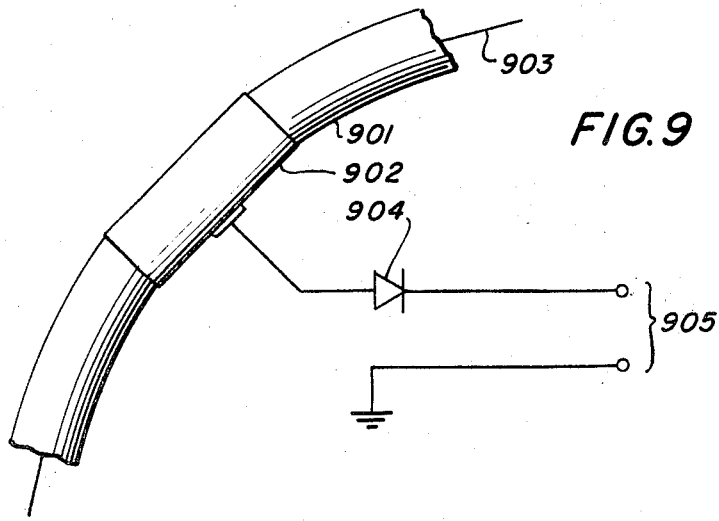

In FIGURE 8, a lamp, schematically indicated at 801 is located within a rotatable housing 802, having a slot 803 therein. Located in light-receiving relation are a pair of photo diodes 805, 806 which, upon becoming conductive, change their resistance from a high-value to a very low value, thus providing the effect of switches 17, 18 (FIGS. 1, 3) or 98, 99 (FIG. 4).

Pulses can also be obtained by inductive or capacitative coupling to the ignition wiring of the engine. For capacitative coupling, an ignition cable 901 has a metal jacket 902 applied thereover for a short distance, thus forming, in effect, a capacitor with the central conductor 903 of the ignition wiring. Output is taken from jacket 902 over a diode 904, to prevent occurrence of positive pulses and will appear at terminals 905. The output can again be utilized similar to that obtained at terminal 705, FIGURE 7. If more than one pulse is necessary to control the particular circuits, then such jackets 902 may be applied to the ignition wires supplying ignition potential to the spark plugs of more than one cylinder. The wires chosen to have the jackets applied thereto are preferably those which will have an impulse occurring thereon just about when an injection valve to admit fuel is ready to open. Since this will occur at a time before the power stroke, the pulse from terminals 905 taken off the spark plug connection of one cylinder will control the injection of fuel to another.

We claim:
1. Fuel injection control system for internal combustion engines having a plurality of electrically controlled fuel injection valves comprising:
   means sensing operating parameters of the engine;
   a monostable multivibrator interconnected with said sensing means and having a pulse period depending on a sensed operating parameter;
   means synchronizing said monostable multivibrator circuit with the speed of the engine;
   signal generator means connected to the engine and providing a plurality of output pulses in synchronism with the speed of the engine, the output pulses of said signal generator means being temporarily staggered with respect to each other; and
   a plurality of AND-gates, each having an output of said signal generator means and of said multivibrator applied thereto, the output of said AND-gates being applied to selected injection valves to open said valves upon concurrence of a pulse from the multivibrator circuit and a selected pulse from said signal generator means.

2. System as claimed in claim 1, wherein said signal generator means has a plurality of output terminals, one each having a pulse appearing thereon during each camshaft-revolution of the engine; and an AND-gate is provided corresponding to each of said output terminals and having one pulse applied thereto.

3. System as claimed in claim 1, wherein said signal generator means provides pulses of equal length, each of said pulses being at least as long as the longest pulse from said multivibrator circuit.

4. System as claimed in claim 1, wherein said signal generator means comprises a plurality of contacts, said contacts closing sequentially in synchronism with the speed of the engine; and any one contact remaining closed until just prior to the closing of a subsequent contact.

5. System as claimed in claim 1 for use with an engine having a distributor, wherein said signal generator means comprises a plurality of contacts located in the distributor.

6. System as claimed in claim 1 wherein said signal generator means comprises a bistable multivibrator circuit having a pair of input terminals, pulsed in synchronism with the speed of the engine, the output of said bistable multivibrator circuit controlling the opening of said AND-gates.

7. System as claimed in claim 1, wherein said signal generator means comprises a second monostable multivibrator pulsed in synchronism with the speed of the engine, said monostable multivibrator having a pair of oppositely phased outputs, said oppositely phased outputs controlling the opening of said AND-gates.

8. System as claimed in claim 7 wherein said second monostable multivibrator circuit has a switching time constant which is small with respect to the shortest time of opening of said injection valves; and a contact is provided connected to control the state of said multivibrator having substantially equal opening and closing time periods and being operated in synchronism with the speed of the engine.

9. System as claimed in claim 1, wherein said engine has a fuel controller; means sensing the position of said controller; means sensing the speed of the engine; electrical means connected to said controller position sensing means and said speed sensing means deriving a blocking potential upon concurrence of: engine speed above a predetermined value, and fuel controller closed;
   and wherein said AND-gates have at least three inputs, the third input to said AND-gates having said blocking potential applied thereto.

10. System as claimed in claim 1 wherein said signal generator means comprises a contactless pulse source operated in synchronism with the speed of the engine.

11. System as claimed in claim 1 wherein said signal generator means comprises an electromagnetic pulse source measn driven in synchronism with the speed of the engine.

12. System as claimed in claim 1, wherein said signal generator means comprises a photo-electric pulse source means driven in synchronism with the speed of the engine.

13. System as claimed in claim 1 for use with an engine having an ignition system including ignition cables; wherein said signal generator means comprises a capacitative pick-off capacitatively coupled to an ignition cable.

References Cited

UNITED STATES PATENTS

| 3,005,447 | 10/1961 | Baumann et al. | 123—32 |
| 3,032,025 | 5/1962 | Long et al. | 123—179 |

LAURENCE M. GOODRIDGE, *Primary Examiner.*

U.S. Cl. X.R.

123—32, 98